United States Patent Office 3,606,376
Patented Sept. 20, 1971

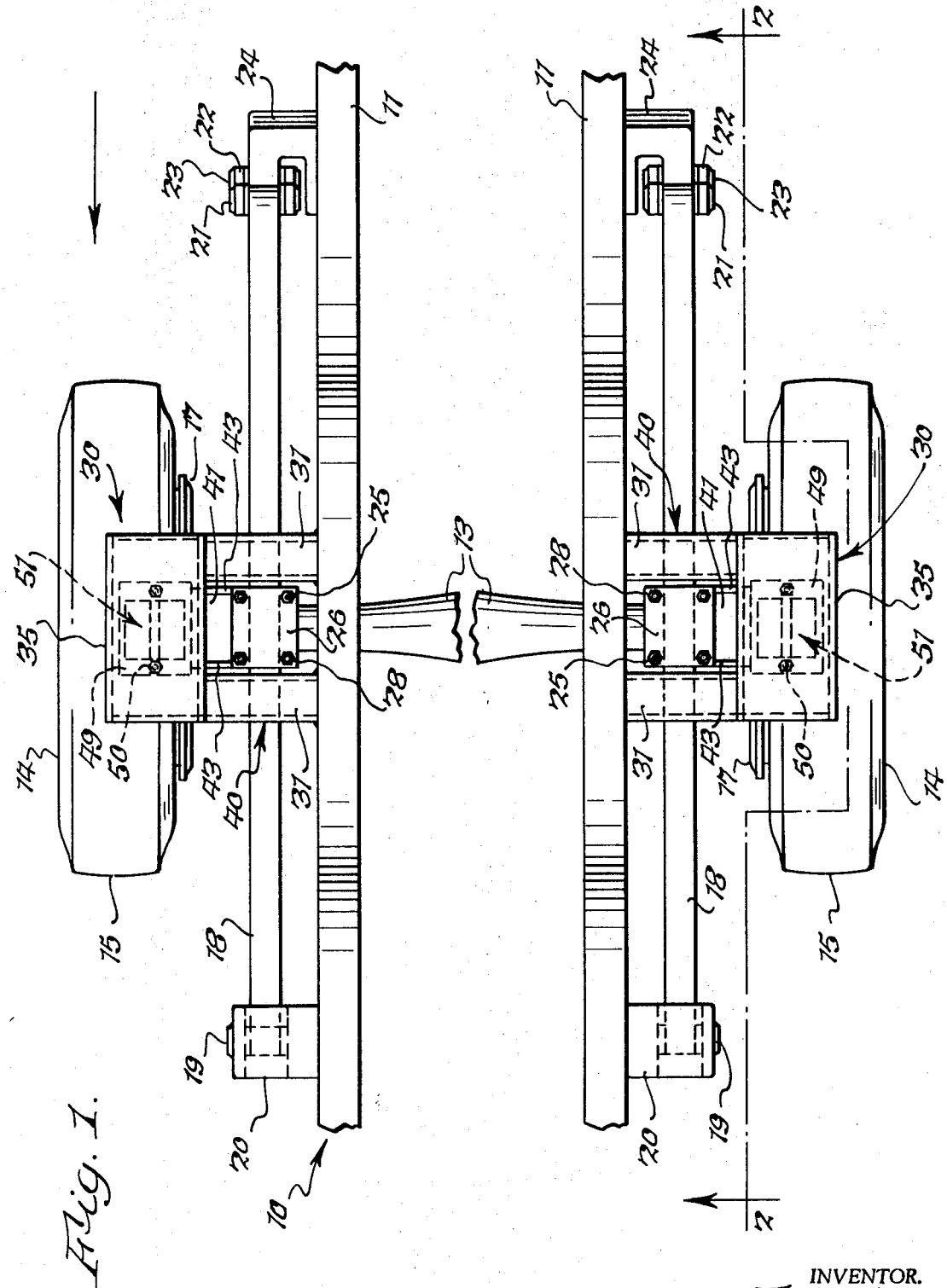

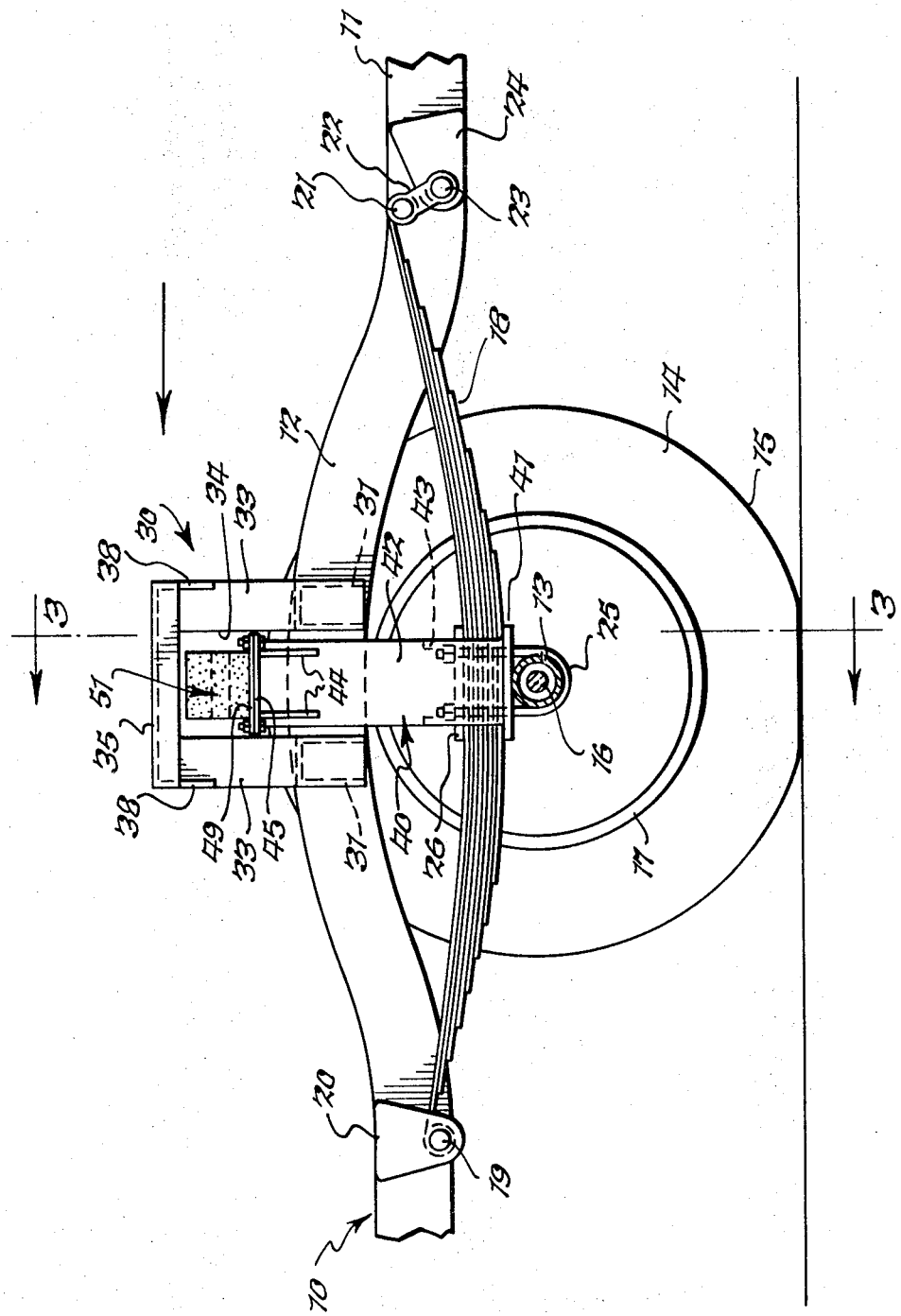

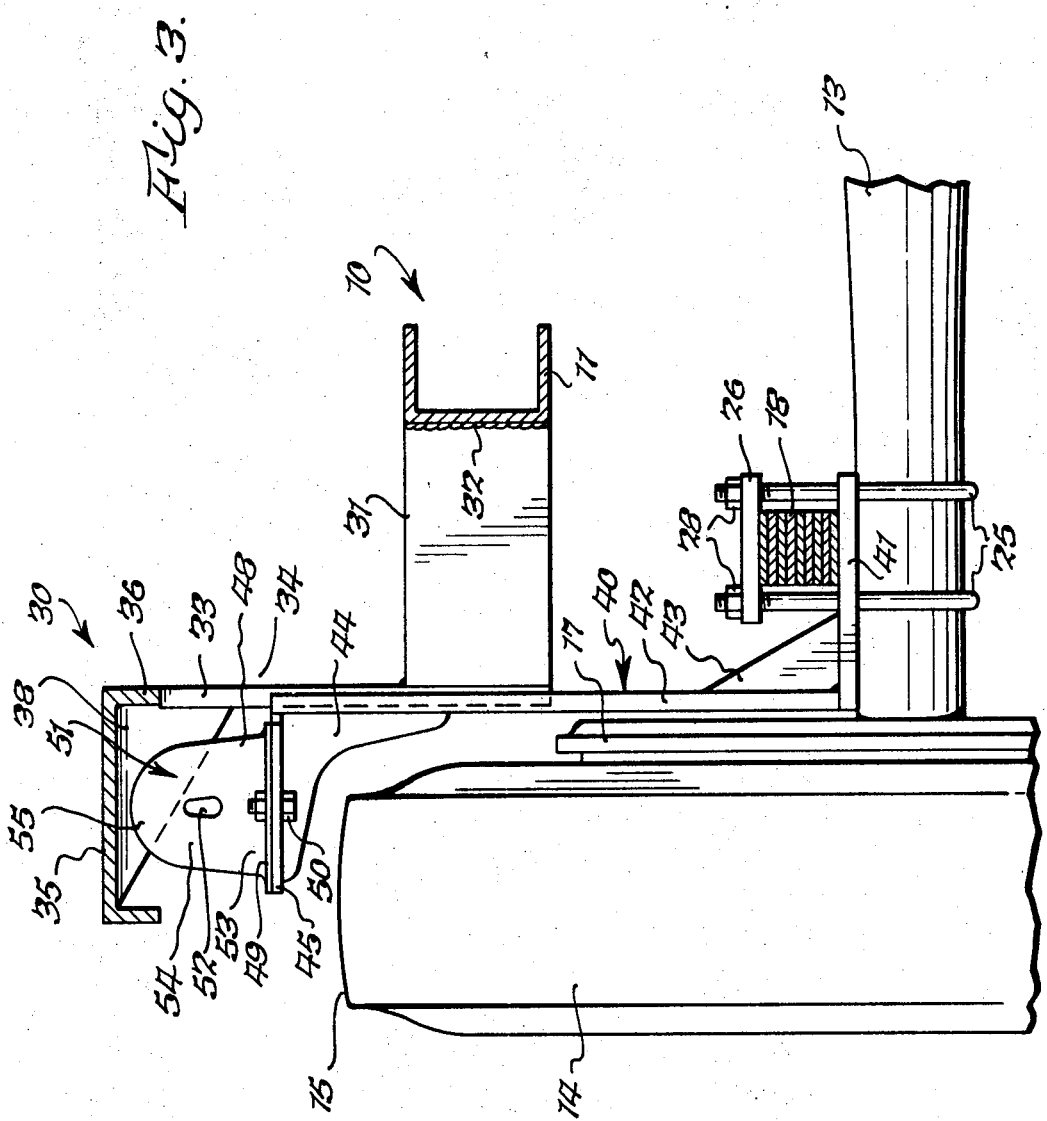

3,606,376
SECOND STAGE SPRING SUSPENSION
Albert F. Hickman, 8009 N. Gowanda State Road,
Eden, N.Y. 14057
Continuation-in-part of application Ser. No. 641,000,
May 25, 1967. This application July 22, 1969, Ser.
No. 843,727
Int. Cl. B60g 9/04, 11/40
U.S. Cl. 280—124RS                 4 Claims

ABSTRACT OF THE DISCLOSURE

As a helper spring for the rear end of a conventional through axle pick-up truck or the like, a frame and an axle bracket have base parts secured at each axle end, intermediate parts extending along the inner side of each wheel, and end parts adjacent and preferably radially in line with and above the tire treads. A resilient rubber body, preferably acted on in generally vertical compression to expand and contract horizontally, is interposed between each pair of these end parts, and preferably are located to provide high and widely spaced spring centers for stable support of the load on the truck.

---

This application is a continuation-in-part of my copending application Ser. No. 641,000 filed May 25, 1967 for Vehicle Spring Suspension, now Pat. No. 3,482,852, and having the effective filing date of its companion British Pat. 1,147,948 filing date, namely June 16, 1966.

Objects of the invention are to provide helper or second stage springs for the opposite ends of the drive axle of a conventional leaf spring truck which provide wider and higher effective spring centers than the leaf springs for improved sidesway control under load; which are accommodated in the very small space between the wheels and truck frame or body without interference with any parts of the conventional truck or with the use of tire chains; in which the resilience is provided by the friction free stressing of resilient rubber bodies, preferably by acting on the rubber bodies directly in compression; which is simple, inexpensive and easy to install; and which will stand up for a long time under conditions of severe and constant use.

In the accompanying drawings FIG. 1 is a fragmentary top plan view of the rear end of the underframe of an unloaded conventional leaf spring truck having a second stage or helper spring structure embodying the present invention, the direction of travel of the vehicle being indicated by the large arrows above FIGS. 1 and 2. FIG. 2 is a fragmentary vertical section taken generally on line 2—2, FIG. 1. FIG. 3 is an enlarged fragmentary vertical section taken generally on line 3—3, FIG. 2.

The invention is illustrated in conjunction with the underframe 10 of a conventional leaf spring truck, such as a pick-up truck having a body (not shown) which includes a cab at the front end and a floor and side walls extending rearwardly from the cab and terminating in an open rear end usually served a tail-gate.

The underframe 10 has the usual main longitudinal side bars 11 which are shown as having upwardly arching portions 12 over and to accommodate upward movement of the usual drive axle housing 13. This drive axle housing is in the form of a through axle and is supported at its opposite ends through the usual bearings (not shown) on rubber tired drive wheels 14, the tread of which is indicated at 15. These drive wheels are driven through drive axles 16 contained within the opposite ends of the drive axle housing 13 and served by the usual differential (not shown). Power brakes are provided for the wheels, the cylindrical housings for such power brake being indicated at 17.

The frame 10 is shown as supported on its drive wheels 14 by means of a pair of conventional leaf springs 18. Each of these leaf springs is shown as pivotally connected at its forward end through a pin 19 and bracket 20 to the companion main longitudinal side frame bar 11 immediately in front of its arching portion 12. The rear end of each leaf spring 18 is shown as connected by a pin 21 to one end of a shackle 22, the opposite end of which is connected by a pin 23 to a bracket 24 fixed to the companion main longitudinal side frame bar 11 immediately in rear of its arching portion 12.

The leaf spring 18 is shown as having the conventional center leaves of progressively diminishing length and the center of each bundle of spring leaves is shown as secured on top of the corresponding end of the axle 13 by means of a pair of U-bolts 25 which embrace the axle and have upwardly projecting legs on opposite sides of each leaf spring which legs extend through the corners of an anchoring plate 26 which is clamped downwardly on the leaf spring 18 by means of nuts 28 on the upper threaded ends of the links of the clamping bolt 25.

Such a leaf spring is entirely adequate for supporting the empty body (not shown) of a pick-up truck or even with a light load. Such leaf springs 18 are inadequate, however, when a camper body (not shown) is mounted on the pick-up truck body, especially when the latter contains heavy-duty camping paraphernalia, as well as human occupants. As an example such camper body can include a high center part which is set down into the body of the pick-up truck and can include a forward extension of substantial weight extending over the cab of the pick-up truck. Such camper bodies often also extend rearwardly from the rear of the truck. It is obvious that such a high camper body, especially when loaded with equipment and people, not only imposes a heavy load upon the leaf springs 18 but also has a very high center of gravity which magnifies the problem of sidesway.

To adapt such conventional leaf spring truck to the heavy load and high center of gravity of such a camper body, it is provided with the second stage or help spring embodying the present invention and which is preferably constructed as follows:

The numeral 30 represents a frame bracket over each end of the through axle 13. Each frame bracket is shown as comprising a pair of downwardly opening horizontal channel-shaped base members or parts 31 arranged parallel with the corresponding end of the through axle 13 and projecting from the outer face of the corresponding main longitudinal side frame bar 10 to which face they are welded, as indicated at 32. Each pair of these base members are spaced a substantial distance from a vertical plane intersecting the axis of the through axle 13 and a vertical intermediate part in the form of a plate 33 is welded to the outboard end of each base part 31 and projects upwardly therefrom to a point above the tread 15 of the companion wheel 14. These vertical frame bracket plates 33 are also spaced from each other and from a vertical plane intersecting the axis of the through axle 13, this space being indicated at 34. A horizontal downwardly opening rectangular channel 35 has its inner flange 36 welded to the tops of each pair of upright frame bracket plates 33 so as to close the top of the space 34 therebetween and also so as to project outwardly over the top of the tread 15 of the companion tire 14 and form an end part for each axle bracket opposite from its base parts 31. This top channel or outer end part 35 can be reinforced by a pair of triangular gussets 38.

An axle bracket, indicated generally at 40, is fixed to each end of the through axle 13. This axle bracket comprises a base part in the form of a plate 41 which can be secured against the corresponding axle end by the same U-bolts 25 which also secure the corresponding leaf spring 18. As shown, this base plate 41 is arranged between its axle end and the corresponding leaf spring 18 but it obviously could be arranged in the substitution for the clamping plate 26, or secured to the axle end in any other manner. The outboard end of each base plate 41 is shown as arranged close to the brake drum 17 of the corresponding wheel 14 and has welded thereto an upright intermediate axle bracket part in the form of a plate 42 which extends upwardly into the space 34 between the upright plates 33 of the frame bracket 30. A gusset 43 can strengthen the connection between each base plate 41 and upright axle bracket plate 42 and a pair of brackets 44 can be secured to project outwardly from the upper end of the upright axle bracket plate 42 outwardly over the tread 15 of the companion wheel 14. These brackets 44 jointly support an end part in the form of a horizontal top plate 45 which is arranged directly under the top channel member 35 of the frame bracket 30 and hence above and in line with the head 15 of the rubber tired wheel 14.

A helper or second stage spring means 48 is interposed between the top plates or outer end parts 45 and 35 of each axle bracket 40 and frame bracket 30, respectively. This spring means is preferably in the form of the compression rubber spring forming the subject of my copending application Ser. No. 732,799, filed May 7, 1968. This compression rubber spring is shown as comprising a metal base plate 49 secured to the top plate 45 of the axle bracket 40 by bolts 50 and as having a rubber body 51 vulcanized to and rising from its top face. This rubber body has a horizontal central through opening 52 extending lengthwise of the line of travel of the vehicle and this opening provides a base 53, integral body side walls 54 rising from this base and an integral top arch 55 connecting the upper ends of these side walls 54. While the bottom of each rubber body 51 is fixed to its axle bracket 40, it is not connected to the companion frame bracket 30 and it is free to leave contact with this frame bracket, and is out of contact therewith in the unloaded condition of the truck frame shown. However, when the truck frame and its body (not shown) is loaded, as by securing a camper body (not shown) thereon, the arching top portion of each rubber spring 51 is brought into pressure contact with the bottom of the top plate or end part 35 of the frame bracket so as to add the resilient support of the two compression rubber bodies 51 to the resilient support provided by the leaf springs 18.

OPERATION

The direction of vehicle travel is indicated by the large arrows associated with FIGS. 1 and 2 and in the unloaded condition of the vehicle frame 10 the second stage or helper spring suspension forming the subject of the present invention is out of service, the top arches 55 of the pair of compression rubber bodies 51 being out of contact with the horizontal top plates 35 of the two frame brackets 30 at opposite ends of the through axle 13, as shown. Accordingly in such unladen condition the frame is supported exclusively by the conventional leaf springs 18 which connect each end of through axle 13 in the conventional manner. An upward force against either wheel 14 flexes the corresponding leaf spring 18 upwardly to provide a resilient mounting for the frame 10, the elongation of each leaf spring 18 being accommodated by its shackle 22 in the usual and well-known manner.

When, however, a heavy load, such as a camper body, is placed upon the truck frame, the truck frame 10 is forced downwardly to a greater degree and the end part or top channel 35 of its frame bracket 31 is brought into pressure contact with the top 55 of the compression rubber spring body 51 carried by the end part or top plate 45 of the companion axle bracket 40. In the manner of this compression whereby substantially constant rate helper or second stage springing is provided by the rubber bodies 51 in compression is more thoroughly detailed and illustrated in my said application Ser. No. 732,799, filed May 7, 1968, for compression rubber spring.

It will be particularly noted that by having a frame bracket 30 with an end part in the form of a top channel 35 arranged above and in line with the tread 15 of each wheel 14 and by having an axle bracket 40 with an end part in the form of a top plate 45 arranged between the top of thread 15 of its wheel and its horizontal top channel 35 of the frame bracket 30, the second stage spring means 51 of the present invention are arranged at a very favorable position with reference to sidesway control of a load even though the load is heavy and has an unusually high center of gravity, as with a camper body. Thus it will be noted that this location of the compression rubber body spring means 51 provides very high and very wide effective spring centers for the laden truck. When unladen the effective spring centers is represented by the close spacing of the leaf springs 18 which are located a substantial distance inwardly from the wheels 14. While such closely spaced spring centers are adequate and conventional for present day pick-up trucks, it will be noted that when, under load, pressure contact is made between the compression rubber springs 51 and the top channels 35 of the frame brackets 30, the effective spring centers are immediately spread outwardly from the center of the frame so that to be almost as wide as the wheels 14 themselves. Such spacing improves sidesway control in accordance with the square of the increased distance and hence it will be seen that a greatly improved sidesway control is provided for high center of gravity loads. Furthermore, the second stage or helper spring means 51 are arranged above and in line with the treads 15 of the wheels 14 and hence are arranged much higher than the conventional leaf springs 18. This greater height also greatly adds to sidesway control. Further the compression rubber springs 51 can be designed to provide a substantially constant rate of resilient resistance up to the point where the openings 52 are flattened out and in such substantially constant rate deflection provides powerful second stage or helper spring support for the truck body.

In the preceding description and in the following claims "wheel" is intended to include the ground engaging supporting means 14 supporting the opposite ends of the through axle 13 regardless of whether in the form of the single wheel shown or in the form of a dual tired wheel, and also the term "rubber" is intended to include natural or synthetic rubber or mixtures of both.

What is claimed is:

1. A second stage vehicle spring suspension for use in conjunction with a vehicle frame, a through axle arranged transversely under and projecting from opposite sides of said frame, a rubber tired wheel supporting each end of said through axle and having a road engaging tread, and a first stage spring suspension for said frame on said axle which first stage spring suspension comprises a leaf spring having a central part secured to each axle end between the corresponding wheel and the longitudinal center of the frame and extending lengthwise of the line of travel of the vehicle, means supporting said frame on one end of each leaf spring, and shackle means supporting said frame on the opposite end of each leaf spring, wherein the improvement comprises an axle bracket having a base part secured to each axle end between the corresponding wheel and the center of the frame, an intermediate part extending along the side of its wheel facing the longitudinal center of the frame, and an end part arranged adjacent said tread of its rubber tired wheel, a frame bracket having a base part secured to each side of said frame, an intermediate part and an end part remote from said frame bracket base part and arranged in vertical alinement with said tread of the adjacent rubber tired wheel and adjacent said end part of the corresponding axle bracket and a vertically distortable resilient rubber body interposed between said end parts of each pair of said axle and frame brackets and arranged in vertical alinement with said tread of the adjacent rubber tired wheel and forming a second stage spring having resilient resistance sufficient to provide desirable ride characteristics for the load on said frame.

2. A second stage vehicle spring suspension as set forth in claim 1 wherein said end parts of each pair of axle and frame brackets are each generally horizontal and project outwardly from their said intermediate parts away from the longitudinal center of the frame.

3. A second stage vehicle spring suspension as set forth in claim 1 wherein said intermediate part of each frame bracket is in the form of a pair of upstanding plates arranged generally parallel with the line of travel of the vehicle and spaced from each other lengthwise of the said line of travel and wherein said intermediate part of each axle bracket is in the form of an upstanding plate arranged generally parallel with the said line of travel and arranged between said pair of upstanding plates of the corresponding frame bracket.

4. A second stage vehicle spring suspension as set forth in claim 3 wherein said end part of each axle bracket projects horizontally from the upper end of its upstanding plate over the tread of its rubber tired wheel and wherein said end part of each frame bracket project horizontally from the upper ends of its pair of upstanding plates over said end part of the corresponding axle bracket and wherein each resilient rubber body is compressed between said end parts of its axle and frame brackets to expand and contact laterally of such compression in a generally horizontal direction.

References Cited
UNITED STATES PATENTS

| | | | |
|---|---|---|---|
| 842,001 | 1/1907 | McKay | 267—30 |
| 1,471,474 | 10/1923 | Dahlstrom | 267—28 |
| 1,963,440 | 6/1934 | Jennings | 267—28 |
| 1,939,155 | 12/1933 | Wise | 267—52 |

A. HARRY LEVY, Primary Examiner

U.S. Cl. X.R.

180—71; 267—30